No. 659,336. Patented Oct. 9, 1900.
C. H. BOOTH.
PIPE COUPLING.
(Application filed May 25, 1900.)
(No Model.)
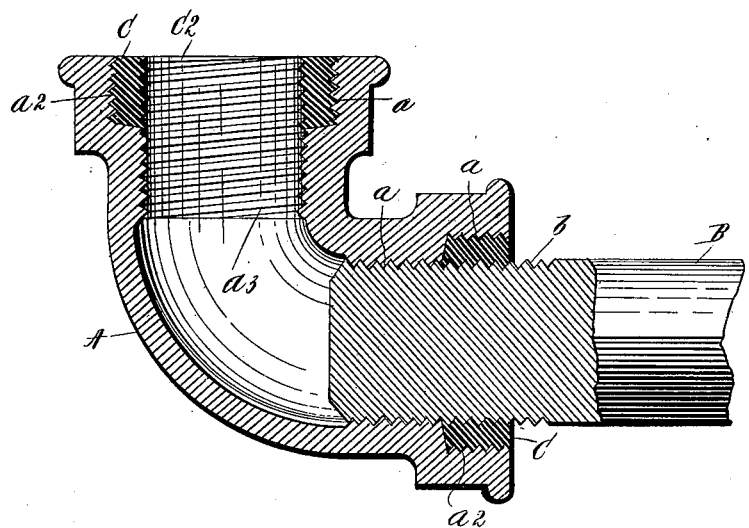
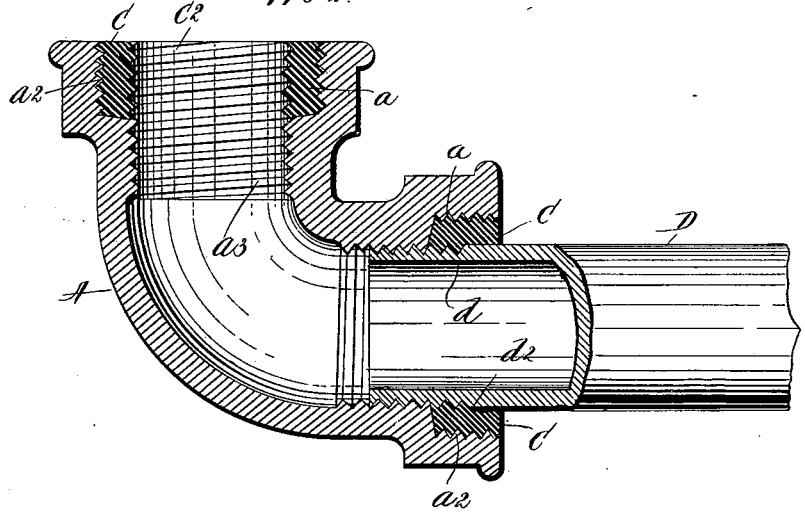
WITNESSES
INVENTOR
Charles H. Booth
BY
ATTORNEYS

UNITED STATES PATENT OFFICE.

CHARLES H. BOOTH, OF NEW YORK, N. Y.

PIPE-COUPLING.

SPECIFICATION forming part of Letters Patent No. 659,336, dated October 9, 1900.

Application filed May 25, 1900. Serial No. 18,014. (No model.)

*To all whom it may concern:*

Be it known that I, CHARLES H. BOOTH, a subject of the Queen of Great Britain, and residing at New York, in the county of New York and State of New York, have invented certain new and useful Improvements in Pipe-Couplings, of which the following is a full and complete specification, such as will enable those skilled in the art to which it appertains to make and use the same.

This invention relates to pipe-couplings; and the object thereof is to provide an improved coupling of this class having packing material secured therein in such manner that in the operation of screwing the pipes into the end of the coupling the connection between the pipes and coupling is securely packed.

The invention is fully disclosed in the following specification, of which the accompanying drawings form a part, in which the separate parts of my improvement are designated by letters of reference in each of the views, and in which—

Figure 1 is a sectional side view of a coupling made according to my invention and showing the method of its construction; and Fig. 2, a view similar to Fig. 1, showing the method of connecting a pipe with the coupling.

In the drawings forming part of this specification I have shown my invention applied to what is known as an "elbow-coupling;" but it will be understood that the invention may be applied to a coupling of any other form, and in the practice of my invention, as shown in the drawings, I provide a pipe-coupling A, the ends of which are provided with annular chambers $a$, the outer walls of which are provided with inwardly-directed beads, ribs, or projections $a^2$, which are formed therein when the coupling is cast, and the inner walls of the coupling at each end are threaded in the usual manner, as shown at $a^3$.

In providing the coupling with my improved packing I employ a mandrel B, having the usual thread $b$, and the mandrel B is screwed into the coupling or the coupling is screwed onto the mandrel, as shown in Fig. 1, and packing material C in a molten condition is poured into the annular space or chamber $a$ between the end walls of the coupling and the mandrel B.

The packing material C is held in position by the beads, ribs, or projections $a^2$ and is preferably composed of a composition of lead and tin, and after the said packing material has cooled the coupling is screwed off of the mandrel or the mandrel is removed from the coupling. This operation leaves a thread in the inner walls of the packing material C, which corresponds with the thread in the inner walls of the coupling A, as is clearly shown at $C^2$ in Figs. 1 and 2, and in connecting a pipe with the coupling thus made, as shown at D in Fig. 2, the pipe is threaded from the end thereof to a predetermined distance, as indicated at $d$. The thread on the pipe D is shorter than the threads on the packing material C and the coupling combined, as shown in Fig. 2, and in screwing the pipe into the coupling that portion of the pipe which is not threaded at $d^2$ compresses the outer threads of the packing material and makes a perfectly tight and secure connection between said pipe and the coupling. The coupling A may be composed of any desired metal—such as iron, steel, brass, &c.—and the pipe B may also be composed of any desired metal, as may also the packing material C, the only object in this connection being to employ packing material which may be compressed in the operation of screwing the pipe into the coupling or screwing the coupling onto the pipe.

By means of this construction I provide a coupling which may be used in connection with water-pipes, steam-pipes, gas-pipes, or for any similar purpose, and one in which the connection between the coupling and the pipe is securely packed at all times by simply making the usual connection between said coupling and pipes.

Having fully described my invention, I claim as new and desire to secure by Letters Patent—

A pipe-coupling, provided at each of its ends with annular chambers commencing at the outside and having a uniform bore, the walls of which are provided with a plurality of annular concentric or parallel ribs; the bore of the coupling inwardly of the chamber being screw-threaded, and solid annular packing material immovably secured in the said chambers and entering between each of the concentric ribs, the outer faces of the packing being flush with the outer face of the coupling, and the inner edges of the packing being flush with and threaded to correspond with the inner walls of the coupling, substantially as shown and described.

In testimony that I claim the foregoing as my invention I have signed my name, in presence of the subscribing witnesses, this 21st day of May, 1900.

CHARLES H. BOOTH.

Witnesses:
F. A. STEWART,
C. C. OLSEN.